(12) United States Patent
De Gaillard et al.

(10) Patent No.: US 11,371,357 B2
(45) Date of Patent: Jun. 28, 2022

(54) FABRIC COMPRISING ARAMID FIBRES FOR PROTECTING A BLADE AGAINST IMPACTS

(71) Applicant: SAFRAN AIRCRAFT ENGINES, Paris (FR)

(72) Inventors: Thomas Alain De Gaillard, Moissy-Cramayel (FR); Audrey Myriam Laguerre, Moissy-Cramayel (FR); Gilles Pierre-Marie Notarianni, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 5 days.

(21) Appl. No.: 17/057,835

(22) PCT Filed: May 23, 2019

(86) PCT No.: PCT/FR2019/051193
§ 371 (c)(1),
(2) Date: Nov. 23, 2020

(87) PCT Pub. No.: WO2019/224496
PCT Pub. Date: Nov. 28, 2019

(65) Prior Publication Data
US 2021/0215049 A1 Jul. 15, 2021

(30) Foreign Application Priority Data
May 24, 2018 (FR) ...................................... 1854364

(51) Int. Cl.
*F01D 5/14* (2006.01)
*F01D 5/28* (2006.01)
*F04D 29/32* (2006.01)

(52) U.S. Cl.
CPC ............. *F01D 5/147* (2013.01); *F01D 5/288* (2013.01); *F05D 2300/601* (2013.01); *F05D 2300/603* (2013.01); *F05D 2300/614* (2013.01)

(58) Field of Classification Search
CPC ... F01D 5/147; F01D 5/16; F01D 5/18; F01D 9/041; F01D 5/141; F01D 5/286;
(Continued)

(56) References Cited

U.S. PATENT DOCUMENTS 5,486,096 A * 1/1996 Hertel ..................... F01D 5/288
416/224
8,333,565 B2 * 12/2012 McMillan ............. B29C 70/865
416/230

(Continued)

FOREIGN PATENT DOCUMENTS

EP 3045260 A1 7/2016
WO WO 2015/047755 A1 4/2015

OTHER PUBLICATIONS

French Preliminary Search Report, dated Jan. 15, 2019, for French Application No. 1854364.
(Continued)

*Primary Examiner* — Eric J Zamora Alvarez
(74) *Attorney, Agent, or Firm* — Birch, Stewart, Kolasch & Birch, LLP

(57) ABSTRACT

The invention concerns a fan blade for a turbomachine, comprising: a leading edge and a pressure-side wall, a structural shield, said shield being attached and fixed to the leading edge of the blade and comprising a pressure-side fin attached to the pressure-side wall, and a piece of fabric comprising aramid fibres, attached and fixed to the pressure-side wall of the fan blade such that the piece of fabric extends in the continuation of the pressure-side fin of the shield without covering said pressure-side fin.

13 Claims, 3 Drawing Sheets

(58) Field of Classification Search
CPC . F01D 5/282; F01D 5/288; F01D 5/26; F01D 25/005; F05D 2300/601; F05D 2300/603; F05D 2300/6012; F05D 2300/614; F05D 2230/23; F05D 2220/36; F05D 2240/303; F05D 2240/121
See application file for complete search history.

(56) References Cited

U.S. PATENT DOCUMENTS

| | | |
|---|---|---|
| 2014/0112796 A1 | 4/2014 | Kray et al. |
| 2016/0003061 A1* | 1/2016 | McComb .................. F02C 3/04 60/805 |
| 2016/0201480 A1* | 7/2016 | Foster ................ B29D 99/0014 415/200 |
| 2016/0201607 A1 | 7/2016 | Gallagher et al. |
| 2018/0010614 A1 | 1/2018 | Sellinger et al. |

OTHER PUBLICATIONS

International Search Report and Written Opinion of the International Searching Authority, dated Aug. 21, 2019, for International Application No. PCT/FR2019/051193, with English translations.

* cited by examiner

FABRIC COMPRISING ARAMID FIBRES FOR PROTECTING A BLADE AGAINST IMPACTS

FIELD OF THE INVENTION

The invention relates in a general way to the field of turbomachines, and more particularly to that of the fan blades of these turbomachines and their manufacturing process.

The invention applies more particularly to fan blades made of composite or metallic material, and whose leading edge includes a metallic structural shield.

TECHNOLOGICAL BACKGROUND

A fan blade of a turbomachine has an aerodynamic surface, a leading edge, a trailing edge and pressure and suction side walls that connect the leading edge to the trailing edge.

Turbomachine blades, and in particular fan blades, are subject to considerable mechanical and thermal stress and must meet strict weight and space requirements. It has therefore been proposed to use blades in a composite material with a fibrous reinforcement densified by a polymer matrix, which are lighter than metal blades with equivalent propulsive characteristics and have satisfactory heat resistance.

During the certification and life of an engine, fan blades are subject to bird ingestion. The mechanical behaviour of the fan blades is therefore optimized during the blade design phase to comply with the certification rules.

It is known to equip the fan blades of a turbomachine, made of composite materials, with a metallic structural shield extending over the entire height of the blade and beyond its leading edge, as mentioned in the document EP1908919, and comprising fins configured to rest against the pressure surface and suction surface of the blade. Such a shield indeed protects the composite material blade during an impact of a foreign body on the fan, such as for example a bird, hail or stones. In particular, the metal shield protects the leading edge of the blade avoiding risks of delamination, fibre breakage or damage due to fibre/matrix decohesion. This shield further contributes to the rigidity of the blade which is necessary in particular for frequency and deflection aspects at impact as well as the aerodynamics of the blade, by allowing a thinning of the leading edge.

The shield then follows the shape of the leading edge of the blade and extends in the direction of the trailing edge so as to follow the profile of the pressure surface and suction surface of the blade, between the foot and the tip of the blade. In a known way, the shield can be a metal part, particularly in titanium, and is generally made by milling from, for example, a block of material.

During an impact with a given object, in particular with a bird, the object slides significantly on the suction surface. Conventionally, the length of the fins of the shield, and in particular of the suction fin, is thus adjusted so that these fins fully cover the part of the blade likely to be impacted by objects (taking into account the size, weight, etc., of the objects likely to impact a fan blade). However, on turbomachines whose fan has a high rotational speed and a reduced number of blades, the impact of the object takes place over a longer chord length than in the case of fans with a high rotational speed and a high number of blades. In particular, the axial length of the fan blade to be protected from impact increases as the fan speed and the number of fan blades decreases.

In order to protect the composite blade, it would therefore be necessary to significantly increase the axial length of the suction fin of the shield (up to half the blade chord). However, such an increase is not desirable or not feasible for reasons of mass, manufacturing complexity, etc.

SUMMARY OF THE INVENTION

An objective of the invention is therefore to propose a solution for protecting a blade for a rotating part, and more particularly for a fan, made of a composite material in case of ingestion, without penalizing the mass of the rotating part or its aerodynamics.

To that end, the invention proposes a blade for the rotating part of a turbomachine, in particular a fan for a turbomachine, comprising:
   a leading edge and a suction wall,
   a structural shield, said shield being attached and fixed to the leading edge of the blade and comprising a suction fin fixed on the suction wall and
   a piece of fabric comprising aramid fibres, said piece of fabric being attached and fixed to the suction wall of the blade so that the piece of fabric extends in the extension of the suction fin of the shield without covering said suction fin.

Certain preferred but non-limiting features of the blade described above are the following, taken individually or in combination:
   the piece of fabric comprises a two-dimensional fabric
   the piece of fabric is partially covered by the suction fin of the shield
   the piece of fabric adjoins the suction fin of the shield, without overlapping by the shield
   an aerodynamic surface of the blade has a main direction of extension, defining a longitudinal axis of the blade which is substantially radial to an axis of revolution of the rotating part, and a height corresponding to a distance between a lower limit of the aerodynamic surface and a tip of the blade, the piece of fabric covering the aerodynamic surface over only a part of said height
   the aerodynamic surface has a portion of surface at the suction wall that is free of piece of fabric, said portion of surface being adjacent to the lower limit of the aerodynamic surface
   the piece of fabric covers at most 70% of the height of the blade
   in those areas of the blade which comprise a piece of fabric, an axial length of the assembly formed by the shield and the piece of fabric is between 20% and 50% of an axial length of the blade, where the axial length of the assembly and the axial length of the blade correspond to a curvilinear length in a direction parallel to the axis of revolution of the rotating part
   the blade is made of a composite material comprising a fibrous reinforcement densified by a polymer matrix, the fibrous reinforcement can be formed from a fibrous preform obtained by three-dimensional weaving with evolving thickness and/or
   the blade further comprises an erosion protection film, for example a film comprising polyurethane, said erosion protection film being attached and fixed to the suction wall of the blade so as to extend in the extension of the piece of fabric without covering said piece of fabric.

According to a second aspect, the invention also proposes a fan for a turbomachine comprising at least one blade as described above.

BRIEF DESCRIPTION OF THE DRAWINGS

Other features, purposes and advantages of the present invention will be more readily apparent upon reading the detailed description which follows, and with respect to the appended drawings given by way of non-limiting examples and wherein.

DETAILED DESCRIPTION OF AN EMBODIMENT

Figure 1:
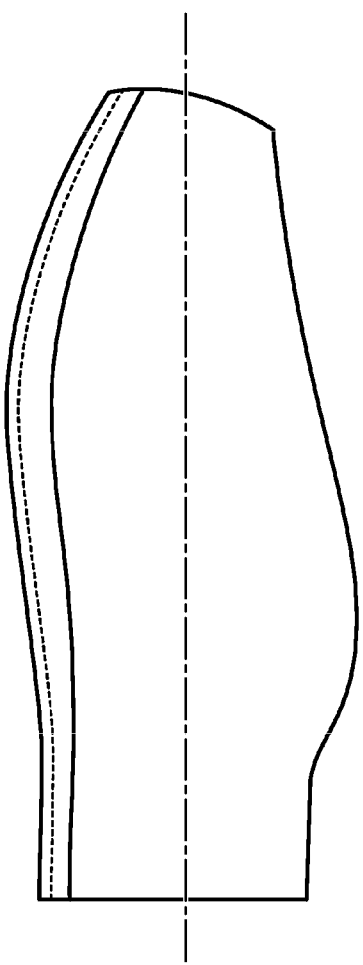
FIG. 1 is a side view of a blade with a structural shield conforming to the prior art.

Hereinbelow, the invention will be described more particularly in the case of a fan blade. It will be understood however that the invention applies mutatis mutandis to the blades of any rotating part of the turbomachine.

In a manner known per se, a fan blade 1 conforming to the invention has an aerodynamic surface 2 with a main direction extending along a longitudinal axis X between a blade foot 1 and a blade tip 1. The blade 1 has a leading edge 4, a trailing edge 5, a pressure wall 6 and a suction wall 7. The leading edge 4 is configured to extend in front of the gas flow entering the turbomachine. It corresponds to the anterior part of an aerodynamic profile facing the airflow and dividing the airflow into a lower and suction surface flow. The trailing edge 5, in turn, corresponds to the rear part of the aerodynamic profile, where the upper and pressure surface airflows meet.

Figure 2:
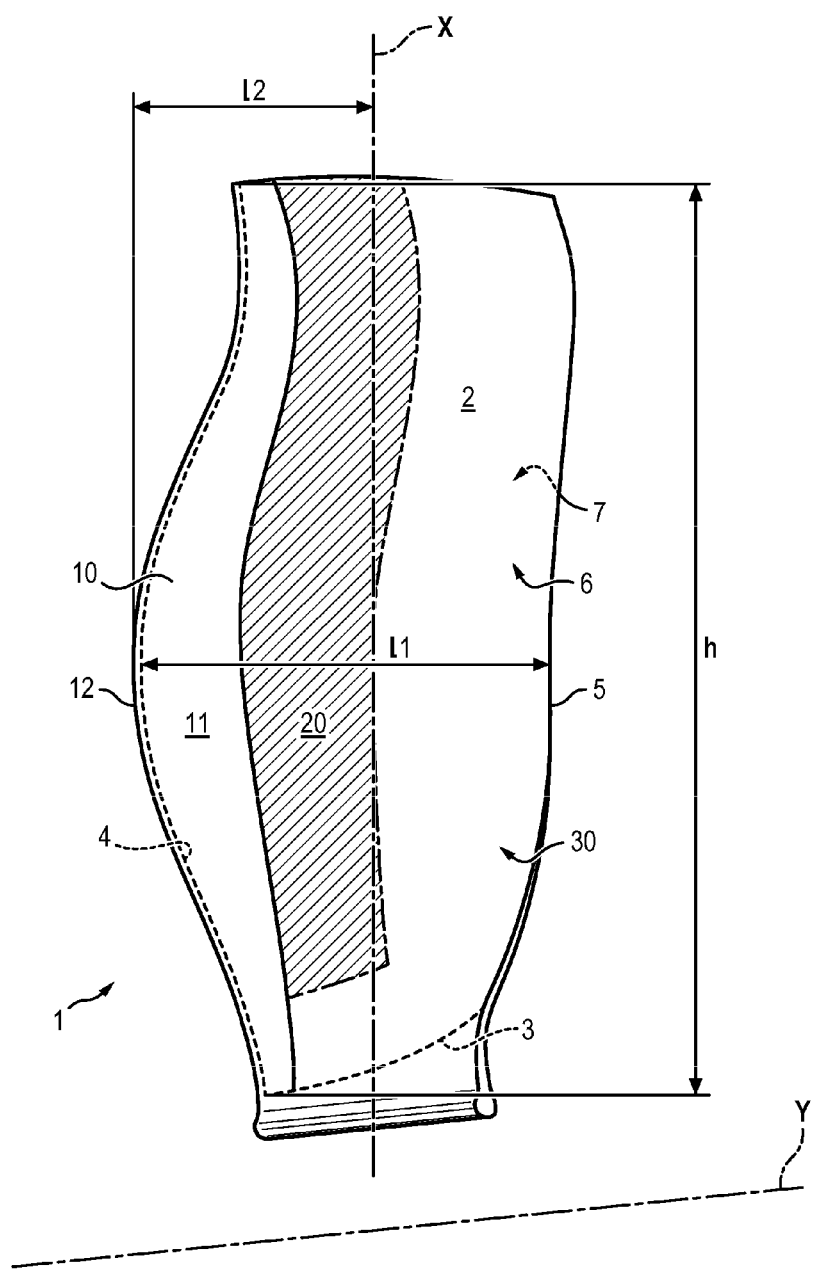
FIG. 2 is a side view of an example of a blade with a structural shield conforming to the invention, in the case where the piece of fabric adjoins the suction fin of the shield.
Figure 3:
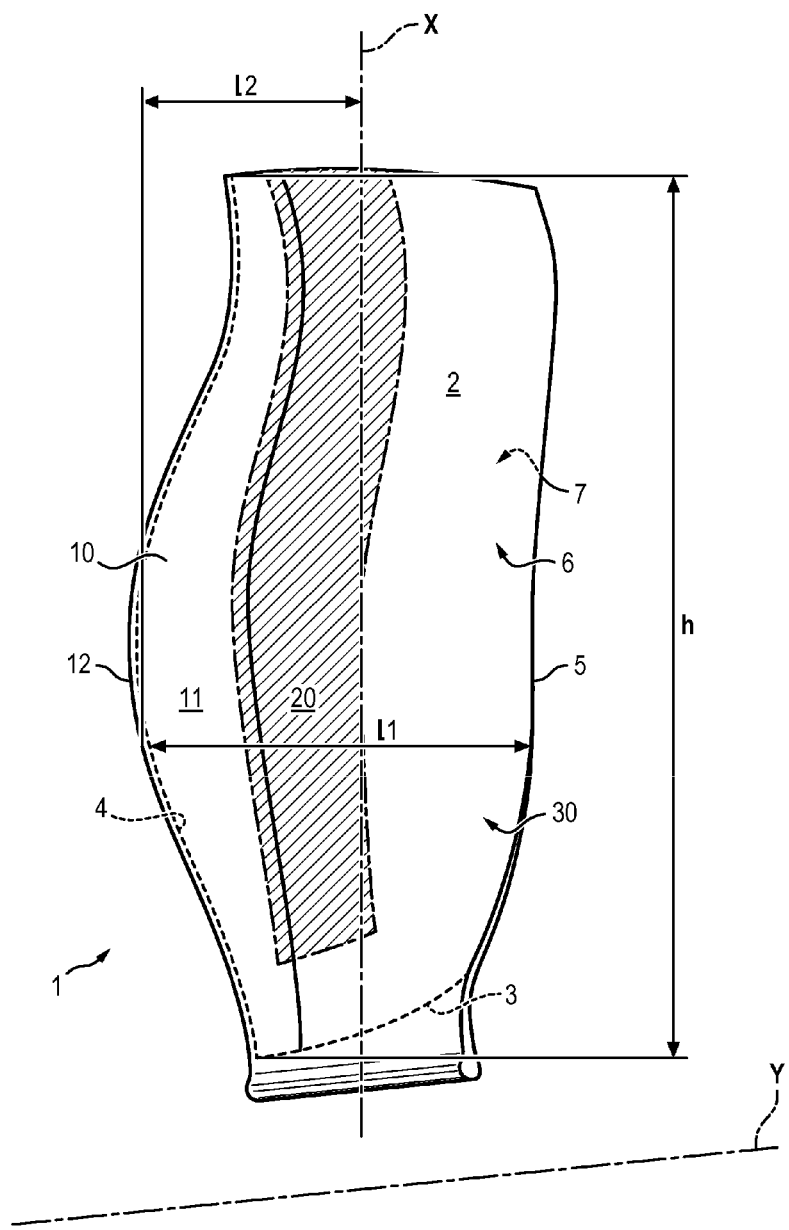
FIG. 3 is a side view of an example of a blade with a structural shield conforming to the invention, in the case where the piece of fabric is partially covered by the suction fin of the shield.

Only the suction wall 6 is shown in FIGS. 2 and 3.

The aerodynamic surface 2 of the blade 1 has a main direction of extension, defining the longitudinal axis X of the blade 1 which is substantially radial to an axis of revolution Y of the fan. The aerodynamic surface 2 also has a height h corresponding to a distance between a lower limit 3 of the aerodynamic surface 2 and a tip of the blade 1, at the intersection of the leading edge 4 and the lower limit 3.

The blade 1 can be made in a composite material comprising a fibrous reinforcement densified by a polymer matrix.

The fibrous reinforcement can be formed from a fibrous preform obtained by three-dimensional weaving with evolutionary thickness. It can include carbon, glass, aramid and/or ceramic fibres. The matrix, in turn, is typically a polymer matrix, for example epoxy, bismaleimide or polyimide.

The blade 1 is then formed by moulding using a vacuum resin injection process of the resin transfer moulding (RTM) or vacuum resin transfer moulding (VARRTM) type.

The blade 1 further includes a structural shield 10 which is attached and fixed to its leading edge 4.

The shield 10 is a one-piece part comprising a substantially V-shaped section with a base configured to extend along the leading edge 4 of the blade 1, as well as a pressure fin 11 and a suction fin configured to conform to the pressure surface 6 and suction walls 7 of the blade 1, respectively. The fins can be tapered or thinned towards the trailing edge 5 of the blade 1.

The shield 10 extends the full height of the aerodynamic surface 2 of the blade 1. Conventionally, when the blade 1 is integrated into a fan, the radially inner portion of the flow stream is delimited by an inter-blade platform (shown in hatched lines in FIGS. 2 and 3). The aerodynamic surface area 2 of the blade 1 then corresponds to the surface area of the blade 1 extending between the tip of the blade 1 and the inter-blade platforms on either side of its foot. Furthermore, the lower limit 3 of the aerodynamic surface 2 of the blade 1 corresponds to the intersection between the blade 1 and the inter-wing platform.

As shown in FIG. 2, the shield 10 follows the shape of the leading edge 4 of the blade 1 which it extends to form a new leading edge 12, called the leading edge 12 of the shield 10. The shield 10 thus forms the aerodynamic profile of the blade 1 at the leading edge 4.

The shield 10 of the blade 1 is usually metallic, for example titanium, in order to confer a high energy absorption capacity due to possible shocks.

The shield 10 and the blade 1 are made separately. The shield 10 is then attached to the leading edge 4 of the blade 1 and fixed to it by gluing, for example with cyano-acrylic or epoxy glue. To that end, the shield 10 has an inner profile adapted to the rounded shape of the leading edge 4 of the blade 1, with or without contact with said leading edge 4. If need be, the upper and lower walls 6 and 7 of the blade 1 can be routed to facilitate the assembly of the shield 10.

In order to protect the fan blade 1 without penalizing its mass or aerodynamics, a piece of fabric 20 comprising aramid fibres is attached and fixed on its suction wall 6, so that the piece of fabric 20 extends in the extension of the suction fin 11 of the shield 10 without covering said fin. Therefore, during impact with an object, the latter slides on the piece of fabric 20 without damaging the wall of the blade 1 to which the piece of fabric 20 is attached.

Preferably, the piece of fabric 20 is attached to the suction wall 6 only. The Applicant indeed noticed the fact that the pressure wall 7 was less prone to impact, so that the protection provided by the shield 10 was sufficient to prevent its damage in the event of impact.

The piece of fabric 20 comprises aramid fibres coated with polymer resin. Therefore, the piece of fabric 20 improves the mechanical behaviour of the blade 1 in the event of impact. Indeed, the absorption energy of the aramid fibres and their interface with the polymer resin is higher than that of the composite material of the blade 1. Furthermore, the piece of fabric 20 allows the damage to the wall of the blade 1 to propagate over a larger area than the impact surface.

The piece of fabric 20 therefore acts as an additional protection for the composite material of the blade 1, as a complement or even as a local and partial replacement of the shield 10, without penalizing the mass of the blade 1. The mass of the piece of fabric 20 is indeed very low due to the use of aramid fibres. The mass of the blade 1 thus obtained is therefore distinctly lower than if the shield 10 had been extended so as to cover the same surface as that occupied by the piece of fabric 20. Furthermore, the use of such a piece of fabric 20 has no impact on the behaviour of the blade 1 in operation nor on its aerodynamic shape and therefore does not require its resizing.

Advantageously, the aramid fibres further provide protection against erosion. However, conventionally, such protection is obtained by applying an anti-erosion film 30 over the entire surface of the blade 1. Typically, the anti-erosion film 30 can include polyurethane.

Consequently, in one embodiment, the areas of the blade 1 to which the piece of fabric 20 is applied are free of anti-erosion film 30. The anti-erosion film 30 then adjoins the piece of fabric 20, i.e. they extend in the extension of each other without overlapping but without leaving any space without both anti-erosion film 30 and piece of fabric 20. Thus, the entire surface of the blade 1 is covered either by the erosion protection film 30 or by the piece of fabric 20.

The piece of fabric 20 can in particular comprise a two-dimensional fabric. The strands of the two-dimensional piece of fabric then have a low titre (i.e. a number of fibres in each strand for example equal to 8 k, corresponding to 8000 fibres per strand, and if possible lower than this value by being if needed at the value of 3 k for 3000 fibres per strand), which limits the surface undulations of the piece of fabric 20. Advantageously, the area of the blade 1 to which the piece of fabric 20 made of aramid fibres is applied has fewer undulations than the rest of the blade 1, which is free of aramid fibre fabric before the application of the anti-erosion film 30.

The aramid fibres may in particular comprise poly(p-phenyleneterephthalamide) (PPD-T—known under the brand Kevlar) fibres.

The piece of fabric 20 can be applied either in such a way as to be adjoining the suction fin 11 of the shield 10 (FIG. 2), without overlapping by the shield 10, or in such a way as to be partially covered by the suction fin 11 of the shield 10 (FIG. 3).

To that end, the piece of fabric 20 can be applied against the fibrous preform intended to form the blade 1 in the injection mould, before injection of the matrix. Alternatively, the piece of fabric 20 can be attached to the blade 1 after injection of the matrix, for example by gluing.

In an embodiment, the piece of fabric 20 covers the aerodynamic surface 2 over only part of its height h. Preferably, the aerodynamic surface 2 has a portion of the surface at the suction wall 6 that is free of the piece of fabric 20. For example, in the case of a fan blade 1 with a reduced rotational speed, the portion of the surface without a piece of fabric 20 is adjacent to the lower limit 3 of the aerodynamic surface 2. Indeed, the Applicant noticed that impacts from objects, and in particular birds, did not degrade the blade 1 beyond the shield 10 in this portion of the blade 1.

Typically, the piece of fabric 20 covers at most 70% of the height of the aerodynamic surface 2, without covering the lower portion of the aerodynamic surface 2 (as shown by way of example in FIGS. 2 and 3).

The shape and dimensions of the piece of fabric 20 can be determined as a function of the following parameters, taken individually or in combination:
the rotation speed of the fan,
the number of blades 1 of the fan
the inter-blade spacing 1,
the three-dimensional shape of the blade 1.
In particular,
the lower the speed of the fan,
the lower the number of fan blade 1, and/or
the greater the inter-blade spacing 1 is,
the larger the area of the assembly formed by the suction fin 11 and the piece of fabric 20 should be.

Preferably, the shape and dimensions of the piece of fabric 20 are determined as a function of these four parameters taken in combination.

For example, for a fan blade 1 with a reduced rotational speed and number of blades 1, at any point of the height h of the aerodynamic surface 2 provided with a piece of fabric 20, the axial length l2 of the assembly formed by the suction fin 11 and the piece of fabric 20 is comprised between 20% and 50% of the axial length l1 of the blade 1.

As used herein, the axial length l2 of the assembly formed by the suction fin 11 and the piece of fabric 20 is defined as the curvilinear length of said assembly between the leading edge 4 of the shield 10 and a downstream edge 21 of the piece of fabric 20, in a direction parallel to the axis of revolution Y of the fan. The downstream edge 21 of the piece of fabric 20 corresponds here to the edge of the piece of fabric 20 that is closest to the trailing edge 5 of the blade 1, as opposed to the upstream edge 22 that is closest to the leading edge 4 of the blade 1.

As used herein, the axial length l1 of the blade 1 is defined as the curvilinear length of the inner wall 6 between the leading edge 4 and the trailing edge 5 of the blade 1, in a direction parallel to the axis of rotation of the fan.

Of course, the axial length l2 of the assembly formed of the shield 10 and the piece of fabric 20 and the axial length l1 of the blade 1 vary between the lower limit 3 of the aerodynamic surface 2 of the blade 1 and the tip of the blade 1.

The size and shape of the piece of fabric 20 and of the suction fin 11 can also be optimized. In particular, the shield 10 represents a significant mass in comparison with the piece of fabric 20, but gives the fan blade 1 the necessary rigidity in particular for the frequency and impact deflection aspects. It is therefore necessary to keep the suction fin 11, despite the fixation of the piece of fabric 20. Its size and shape can however be adapted in order to reduce the mass of the fan blade 1.

Finally, the piece of fabric 20 can extend continuously along the aerodynamic surface 2. Alternatively, the piece of fabric 20 can be discontinuous and comprise several disjointed portions of piece of fabric 20.

The invention claimed is:

1. A blade for a rotating part of a turbomachine comprising:
   a leading edge and a suction wall;
   a structural shield, wherein the structural shield is attached to the leading edge of the blade and comprises a suction fin fixed to the suction wall;
   a piece of fabric comprising aramid fibres, wherein the piece of fabric is attached to the suction wall of the blade so as to extend as an extension of the suction fin of the structural shield without covering the suction fin; and
   an erosion protection film attached to the suction wall of the blade so as to extend as an extension of the piece of fabric without covering said piece of fabric.

2. The blade of claim 1, wherein the piece of fabric comprises a two-dimensional fabric.

3. The blade of claim 1, wherein the piece of fabric is partially covered by the suction fin of the structural shield.

4. The blade of claim 1, wherein the piece of fabric adjoins the suction surface of the structural shield, without being overlapped by the structural shield.

5. The blade of claim 1, wherein the piece of fabric covers an aerodynamic surface of the blade over only a part of a height of the blade.

6. The blade of claim 5, wherein the aerodynamic surface has a surface portion at the suction wall which is free of the piece of fabric, said surface portion being adjacent to a lower limit of the aerodynamic surface.

7. The blade of claim 5, wherein the piece of fabric covers no more than 70% of the height of the blade.

8. The blade of claim 1, wherein, in areas of the blade which comprises the piece of fabric, an axial length of an assembly formed by the structural shield and the piece of fabric is between 20% and 50% of an axial length of the blade, where the axial length of the assembly and the axial length of the blade correspond to a curvilinear length in a direction parallel to an axis of revolution of the rotating part.

9. The blade of claim 1, said blade being made of a composite material comprising a fibrous reinforcement densified by a polymer matrix.

10. A fan for a turbomachine, wherein the fan comprises at least one blade as claimed in claim 1.

11. The blade of claim 1, wherein the blade is a fan blade for a turbomachine.

12. The blade of claim 1, wherein the erosion protection film comprises polyurethane.

13. The blade of claim 9, wherein the fibrous reinforcement is three-dimensionally weaved.

* * * * *